Figure 1:
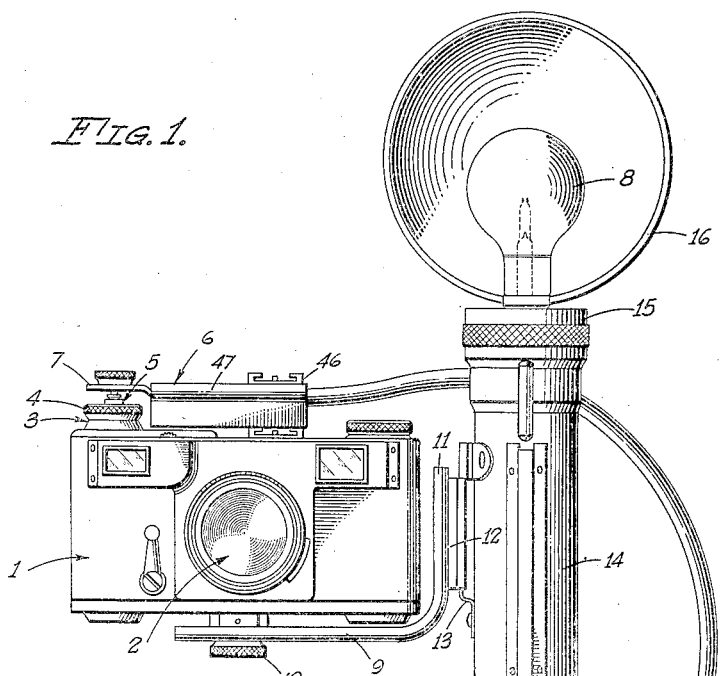

Feb. 16, 1943.  I. JACOBSON  2,311,440

CAMERA AND LIGHT SYNCHRONIZER

Filed May 9, 1938

INVENTOR.
IRVING JACOBSON
BY Harold W. Mattingly
ATTORNEY.

Patented Feb. 16, 1943

2,311,440

UNITED STATES PATENT OFFICE 2,311,440

CAMERA AND LIGHT SYNCHRONIZER

Irving Jacobson, Los Angeles, Calif., assignor to The Folmer Graflex Corporation, Rochester, N. Y., a corporation of Delaware Application May 9, 1938, Serial No. 206,842

11 Claims. (Cl. 67—29)

My invention relates to camera shutter and flash lamp operating mechanisms and has particular reference to a device for accurately synchronizing the opening of the camera shutter with the attainment of maximum brilliancy of a photoflash lamp employed in making an exposure.

In my copending application Serial No. 136,570, filed April 13, 1937, now Patent No. 2,161,355, June 6, 1939, I disclose an electrical device interconnected with the switch employed to fire a photoflash lamp, the electrical device to open automatically the camera shutter in accurate synchronized relation with the attainment of maximum brilliancy of the light produced by the photoflash lamp. In the present application I provide a novel switch mechanism and camera shutter operating mechanism, particularly adapted to cameras of the "focal plane shutter" type.

In cameras of the type employing focal plane shutters, it is the common practice to employ a spring mechanism wound up prior to each exposure to operate the camera shutter, suitable timing mechanism being interposed therein to allow a predetermined time period between the opening of the shutter and the closing of the shutter to thus permit the selection of the length of the exposure desired by the operator of the camera. To synchronize properly the firing of a flash lamp with different time adjustments of the shutter, it is essential that the flash lamp be fired at such time that it will attain its maximum brilliancy or maximum light intensity immediately the shutter is opened so that irrespective of the time period of the exposure the shutter will be open during the maximum brilliancy of the lamp.

It is therefore an object of my invention to provide a camera shutter operating device which will actuate the trigger of the shutter mechanism required to open the shutter and to employ this mechanism as a means for supplying electric current to the photoflash lamp in such timed relation to the operation of the trigger that the lamp will attain its maximum brilliancy in exact synchronism with the opening of the shutter.

Another object of my invention is to provide a mechanism of the character described which may be readily secured upon a camera of the focal plane shutter type, particularly the forms of such camera which are extremely small in size, without interference with the normal operating mechanism of the camera.

Another object of my invention is to provide a synchronizing device for synchronizing the firing of the flash lamp with the opening of the shutter, as set forth in the preceding paragraphs, wherein great accuracy of synchronization adjustment may be had and wherein once the shutter is synchronized for one time period of exposure such adjustment will be suitable for any other time period of exposure for which the camera shutter mechanism is adjustable.

Figure 2:
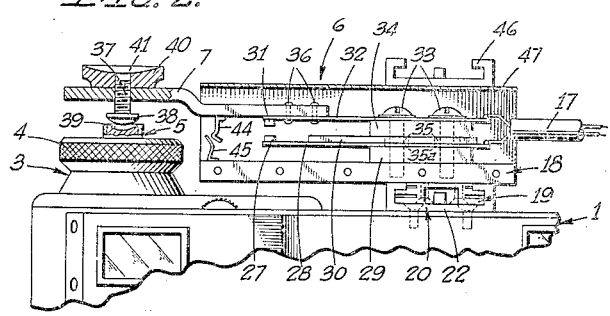
Figure 3:
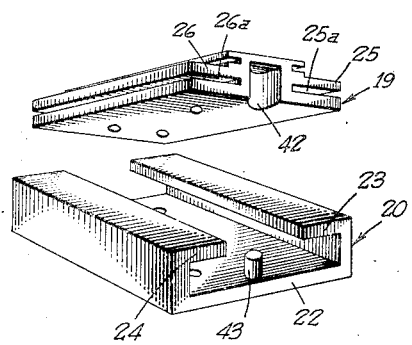

Other objects and advantages of my invention will be apparent from a study of the following specification, read in connection with the accompanying drawing, wherein Fig. 1 is an elevational view of a camera of the focal plane shutter type illustrated in combination with a photoflash lamp and synchronizing mechanism constructed in accordance with my invention;

Fig. 2 is a detail view of the synchronizing attachment constructed in accordance with my invention, illustrated partly in section to disclose the manner in which the same may be readily associated with a focal plane shutter camera mechanism; and Fig. 3 is a detail perspective view of a detachable mounting device by which my synchronizing mechanism may be readily attached to or detached from a camera of the character set forth.

Referring to the drawing, I have illustrated at 1 a camera of the focal plane shutter type, such cameras being known as the "candid camera." Such cameras are made by a number of different manufacturers but include a shutter located in the focal plane of the camera and including one element which may be moved to "open" the shutter, exposing the film to the light projected through the lens 2, while another element is employed to "close" the shutter to cut off light from the film. The operation of these two elements is controlled by a suitable timing mechanism 3, familiar to those skilled in the art, which may be adjusted to any suitable position to determine the length of time between the operation of the first element and the operation of the second element thereby to determine the total length of exposure of the film.

As will be understood by those familiar with this type of camera, the shutter mechanism is actuated by a spring which is wound by the turning of a suitable knob 4 prior to the making of each exposure, the spring upon being wound being released by means of a release button or trigger 5, usually projecting upwardly above the top of the camera case to such position as will permit its ready engagement by the finger of an operator. The mere depression of the trigger 5 will cause the first element to operate to open the shutter while the spring mechanism will cause the operation of the second element at a predetermined time period thereafter, the length of which is selected by adjustment of the member 3.

It is a characteristic of this type of camera shutter that the shutter will open instantly upon the actuation or depression of the trigger 5 so that the time lag between the depression of the trigger 5 and the opening of the shutter is always a constant value irrespective of the selected length of exposure. I employ this characteristic of this type of camera to obtain synchronization between the firing of the flash lamp and the opening of the shutter by providing a switch mechanism indicated generally at 6 adapted to be mounted upon the camera in such position that the operating lever 7 of the switch mechanism is employed both to close the circuit for the photoflash lamp 8 and to operate the trigger 5.

The photoflash lamp 8 may be supported in any suitable manner with reference to the camera 1 though I prefer to provide a bracket 9 secured as by means of a nut 10 to the bottom of the camera 1, the bracket 9 having an arm 11 extending upwardly along one side edge of the camera and being provided with a slide 12 adapted to engage and hold a mounting bracket 13 secured to and forming a part of a battery case 14. The upper end of the battery case is provided with a suitable socket 15, into which the photoflash lamp 8 may be placed, a suitable reflector 16 being employed behind the flash lamp 8 if desired. The battery case 14 houses suitable dry cell batteries necessary for the operation of the photoflash lamp 8 and the circuit for the flash lamp is controlled through a suitable flexible cord or cable 17 which extends to and is coupled with the switch mechanism 6.

Referring particularly to Fig. 3, it will be observed that the switch mechanism 6 includes a base plate 18, to the lower surface of which is secured a slide block 19 adapted to be received in the usual view-finder bracket 20 constituting a part of the standard equipment of cameras of this type. The bracket 20 usually includes a bottom 22 resting upon the upper surface of the top wall of the camera 1 and has side flanges 23 and 24 extending upwardly and inwardly over the bottom of the block to provide sliding guideways extending forwardly and rearwardly of the camera 1.

The slide block 19 to which the switch base 18 is secured is provided with laterally extending feet 25 and 26 adapted to fit snugly with the upwardly and inwardly extending flanges 23, 24 to provide a rigid mounting between the switch base 18 and the camera 1, the feet 25 and 26 being preferably slotted as indicated at 25a and 26a to render the feet sufficiently compressible to fit small variations in the height of the flanges 23 and 24. By slotting the feet 25, 26 resilient means is thus provided that is interposed between the base or base member 18 and the clip or view-finder bracket 20, which resilient means has a stiffness much greater than the stiffness of the spring means that is interposed between the handle or operating lever 7 and the base member or clip for urging said contacts to circuit-opening position. Thus the stiffness of said resilient means prevents forces applied to said handle or operating member 7 from moving said base member relative to said clip or bracket 20. The switch base 18 constitutes a support for a pair of switch contacts, one of which is illustrated at 27 as mounted upon the outer end of a thin strip of resilient metal such as a phosphor-bronze strip 28.

The phosphor-bronze strip 28 is insulated from the base 18 by means of a block of insulating material 29 disposed beneath the rearward end of the strip 28, permitting the major portion of the strip 28 to be freely movable in a vertical direction. The upward movement of the contact 27 is limited by means of a limit bar 30 of any suitable metal or other material having sufficient rigidity to prevent ready flexing thereof, the bar 30 extending a considerable distance along the length of the strip 28 toward the contact 27. Thus while the strip 28 is freely flexible in a downward direction, its upward movement is definitely limited by engagement of the strip 28 with the rigid limiting bar 30.

The cooperating electrical contact 31 is illustrated as being secured to a resilient strip of metal 32 which may also be constructed of phosphor-bronze, the strip 32 being secured to the base 18 by means of screws 33 extending downwardly through an insulating spacing block 34 disposed above the limit strip 30. Thus the screws 33 may be employed to hold the entire assembly of contacts 31 and 27 and their strips 32 and 28, respectively, and the limit strip 30 in place, it being understood that openings 35 through the limit strip 30 and openings 35a through the contact strip 28 are provided for the passage of the screws 33, the diameter of these openings being considerably in excess of the diameter of the screws 33 so as to prevent electrical contact between the screws 33 and the strips 28 and 30.

It will be apparent therefore that depression of the movable contact 31 will cause it to be brought into engagement with its cooperating contact 27 to complete the circuit for firing the photoflash lamp 8. To permit the closing of the contacts 31 and 27 in proper synchronized relation with the actuation of the shutter of the camera 1, I mount the handle or operating lever 7 upon the movable contact 32 as by means of screws or rivets 36 in such manner that the resilient strip 32 normally urges the lever upwardly to the position shown in Fig. 2. The outer end of the operating lever 7 extends above the trigger 5 so that depression of the operating lever 7 to close the contacts 31 and 27 will engage the operating lever 7 with the trigger 5 and cause operation of the trigger.

To time accurately the closing of the contacts 27—31 with the tripping of the trigger 5 necessary to open the shutter, I provide a screw 37 threaded into the operating lever or handle 7, the screw 37 having a rounded head 38 adapted to engage in the rounded depression 39 usually found in the upper ends of the triggers 5. By adjusting the screw 37 upwardly and downwardly relative to the operating lever 7, a predetermined amount of movement of the operating lever 7 will be required to actuate the shutter trigger 5. Thus by initially setting the contacts 27—31 such as to fire the flash lamp 8 prior to the tripping of the trigger 5 by the screw 37, the screw 37 may be adjusted upwardly or downwardly relative to the operating lever 7 until the flash lamp circuit will be closed a fraction of a second before the screw 37 will have depressed the trigger 5 to its fully released position. This adjustment should be such that whatever time lag exists between the actuation of the trigger 5 and the opening of the shutter will be compensated for by completing of the flash lamp circuit a sufficient amount of time prior to the actual opening of the shutter that the flash lamp will attain its maximum brilliancy at the instant of opening the shutter.

The adjustment of the screw 37 to attain this synchronization may be made in the shop and may be accurately checked by suitable synchronizing devices well known in this art and when synchronization has been achieved the screw 37 may be locked in the position desired by means of a lock nut 40 threaded upon the screw 37. The lock nut 40 may constitute a finger-piece by which the operating lever 7 is depressed and is preferably provided with a shallow curved depression 41 adapted to fit the finger of the person using the camera.

I prefer that the initial adjustment of the contacts 27—31 and the screw 37 with reference to its operating lever 7 should be such that prior to the operation of the operating lever 7 the screw head 38 lies above and is clear of the trigger 5, thus permitting the switch mechanism 6 to be readily placed upon the camera or removed therefrom without disturbing the adjusted relation of the screw 37. Hence once the switch mechanism has been adjusted to a particular camera, it may be placed upon or removed from the camera with assurance that whenever it is in position upon the camera it is suitably adjusted to insure accurate synchronization of the opening of the shutter and the firing of the flash lamp.

It will be understood that whenever the switch mechanism 6 is placed upon the camera the curvature of the screw head 38 should be accurately aligned or centered above the curved depression of the trigger 5 and to insure this accurate alignment I prefer to provide a recess 42 formed in the slide block 19, adapted to engage the upper stop pin 43 on the view-finder bracket 20 so that an operator in placing the switch 6 upon the camera will slide the same forwardly until the pin 43 is seated in the recess 42, thus insuring accurate alignment of the trigger and screw.

It sometimes occurs that an operator may, in making an exposure, fail to press the trigger or the operating lever or handle 7 sufficiently to insure complete operation of the shutter and complete closing of the flash lamp circuit and I therefore prefer to provide means for resisting the movement of the handle or operating lever 7 toward circuit closing and shutter operating position until immediately prior to the closing of the flash lamp contacts. Thus when the operator has applied sufficient pressure to move the operating lever past such point the force exerted by the finger will be sufficient to insure complete operation of the camera and the flash lamp. This mechanism is illustrated as a finger 44 carried by the handle or operating lever 7 adapted to engage a light spring 45 secured upon the base 18. The strength of the spring 45 should be such as to provide a small amount of resistance to downward movement of the handle or operating lever 7 but not sufficient to overcome the force of the spring 32, insuring the return of the handle member to its uppermost position.

It will be apparent from the foregoing that I have provided a simple mechanism for closing the circuit to the flash lamp for making exposures, in which the same operating lever which is employed to close the flash lamp circuit is employed to operate the shutter trigger with accurate adjustment to insure the closing of the flash lamp circuit in sufficient time to permit the lamp to attain its maximum brilliancy at the time the shutter is open. Thus irrespective of whether the total exposure time is $1/250$ of a second or $1/10$ of a second, the flash lamp will always be fired at such time that instantly the shutter is open the lamp is at maximum brilliancy.

If desired an auxiliary view-finder bracket 46 may be mounted upon the cover 47 for the switch 6 to provide an attachment upon which the view-finder may be placed while the camera is equipped with the switch 6, it being understood that such auxiliary bracket 46 should be tilted forwardly sufficiently to compensate for the parallax ocasioned by the elevation of the view-finder when used on the switch 6.

While I have shown and described the preferred embodiment of my invention, I do not desire to be limited to any of the details of construction shown or described herein, except as defined in the appended claims.

I claim:

1. The combination with a camera having a shutter and a trigger for actuating the shutter and with a photoflash lamp having a circuit for controlling the same, of a switch for actuating said trigger and for closing the circuit to said flash lamp, including a handle member movable through a predetermined path of movement to close the contacts of said switch, means detachably mounting said switch upon said camera to dispose said handle member relative to said trigger for movement in the direction of movement of said trigger, means on said handle member for engaging said trigger to actuate the same as said handle member is moved toward contact closing position, said mounting means including detachable members normally disposing said trigger engaging means in spaced relation to said trigger, resistance means engageable with said handle for resisting the movement of said handle toward trigger operating position, and means responsive to arrival of said handle at a position closely approaching trigger operating position for disengaging said resistance means from said handle to insure completion of the movement of said handle member.

2. The combination with a camera having a shutter and a trigger for actuating the shutter and with a photoflash lamp having a circuit for controlling the same, of a switch for actuating said trigger and for closing the circuit to said flash lamp, including a handle member movable through a predetermined path of movement to close the contacts of said switch, means detachably mounting said switch upon said camera to dispose said handle member relative to said trigger for movement in the direction of movement of said trigger, means on said handle member for engaging said trigger to actuate the same as said handle member is moved toward contact closing position, said mounting means including detachable members normally disposing said trigger engaging means in spaced relation to said trigger, spring means engageable with said handle for resisting the movement of said handle toward trigger operating position, and a cooperating spring member engageable with said spring means and responsive to arrival of said handle at a position closely approaching trigger operating position for disengaging said spring means from said handle to insure rapid completion of the movement of said handle to trigger operating position, whereby the time between closing of said contacts and the opening of said camera shutter is substantially independent of the pressure applied to said handle.

3. In an attachment device for completing an electric circuit to fire a photoflash lamp in synchronism with the opening of the shutter of a camera having a shutter trigger on the camera case for actuating the shutter and a viewfinder clip on said case including an alignment stop means for positioning a viewfinder in a predetermined location relative to said case, the combination of: a base member including means receivable in said viewfinder clip for detachably securing said base member to said camera case; alignment means on said base member engageable with said alignment stop means for positively disposing said base member in a predetermined aligned position relative to said camera case when inserted in said clip; thus securing accurate alignment of the parts; switch means carried by said base member including a pair of contacts in said circuit; a handle member mounted on said base member for movement to close said contacts and complete said circuit; one of said contacts being attached to said handle member to move therewith, the other of said contacts being so supported on said base member as to be freely flexible in a downward direction, and so flexing when said handle member is moved to close said contacts; actuating means on said handle member disposed in such position relative to said base member as to place said actuating means in a position to engage said trigger when said base member is disposed in said predetermined position and said handle member is moved to contact closing position; and means adjusting the spacing of said actuating means relative to said trigger for synchronizing the opening of said shutter with the firing of said flash lamp.

4. In an attachment device for completing an electric circuit to fire a photoflash lamp in synchronism with the opening of the shutter of a camera having a shutter trigger on the camera case for actuating the shutter and a viewfinder clip on said case including a pair of inwardly facing channels between which is an upwardly extending alignment stop pin for positioning a viewfinder in a predetermined accurate location relative to said case, the combination of: a base member having a pair of outwardly extending flanges closely receivable in said channels to detachably secure said base member to said case; there being a vertically extending recess in said base member between said outwardly extending flanges for receiving said stop pin, thereby positively to dispose said base member in a predetermined accurate position relative to said case when inserted in said clip; switch means carried by said base member including a pair of contacts in said circuit; a handle member mounted on said base member for movement to close said contacts and complete said circuit; actuating means on said handle member disposed in such position relative to said base member as to place said actuating means in a position to engage said trigger when said base member is disposed in said predetermined position and said handle member is moved to contact closing position; and means adjusting the spacing of said actuating means relative to said trigger for synchronizing the opening of said shutter with the firing of said flash lamp.

5. In an attachment device for completing an electric circuit to fire a photoflash lamp in synchronism with the opening of the shutter of a camera having a shutter trigger on the camera case for actuating the shutter and a viewfinder clip on said case, the combination of: a base member including means receivable in said viewfinder clip for detachably securing said base member to said camera case in a predetermined position relative thereto; switch means carried by said base member including a pair of contacts in said circuit; a handle member mounted on said base member for movement to close said contacts and complete said circuit; actuating means on said handle member disposed in such position relative to said base member as to place said actuating means in a position to engage said trigger when said base member is disposed in said predetermined position and said handle member is moved to contact closing position; means adjusting the spacing of said actuating means relative to said trigger for synchronizing the opening of said shutter with the firing of said flash lamp; spring means interposed between said handle and said base member for urging said contacts to circuit opening position; and resilient means interposed between said base member and said clip for securing said base member therein, said resilient means having a stiffness much greater than the stiffness of said spring means whereby the stiffness of said resilient means prevents forces applied to said handle from moving said base member relative to said clip.

6. In an attachment device for completing an electric circuit to fire a photoflash lamp in synchronism with the opening of the shutter of a camera having a shutter trigger on the camera case for actuating the shutter and a viewfinder clip on said case including a pair of inwardly facing channels, the combination of: a base member having a pair of outwardly extending flanges closely receivable in said channels to detachably secure said base member to said case; switch means carried by said base member including a pair of contacts in said circuit; a handle member mounted on said base member for movement to close said contacts and complete said circuit; actuating means on said handle member disposed in such position relative to said base member as to place said actuating means in a position to engage said trigger when said base member is disposed in said predetermined position and said handle member is moved to contact closing position; means adjusting the spacing of said actuating means relative to said trigger for synchronizing the opening of said shutter with the firing of said flash lamp; spring means interposed between said handle and said base member for urging said contacts to circuit opening position; and resilient means in proximity to and cooperating with said flanges to urge said flanges into secure engagement with the sides of said channels to secure said base member in said clip, said resilient means having a stiffness much greater than the stiffness of said spring means, whereby the stiffness of said resilient means prevents forces applied to said handle from moving said base member relative to said clip.

7. In an attachment device for completing an electric circuit to fire a photoflash lamp in synchronism with the opening of the shutter of a camera having a shutter trigger on the camera case for actuating the shutter and a viewfinder clip on said case including a pair of longitudinally extending inwardly facing channels, the combination of: a base member having a pair of outwardly extending flanges closely receivable in said channels to detachably secure said base member to said case; switch means carried by said base member including a pair of contacts in said circuit; a handle member mounted on said base member for movement to close said contacts and complete said circuit; actuating means on said handle member disposed in such position relative to said base member as to place said actuating means in a position to engage said trigger when said base member is disposed in said predetermined position and said handle member is moved to contact closing position; means adjusting the spacing of said actuating means relative to said trigger for synchronizing the opening of said shutter with the firing of said flash lamp; spring means interposed between said handle and said base member for urging said contacts to circuit opening position; and means for rendering said flanges resilient in a direction normal to the surface thereof including longitudinal slots formed in the edges of said flanges, the depth of said slots being such as to render said flanges much stiffer than said spring means, whereby said flanges prevent forces applied to said handle from moving said base member relative to said clip while maintaining secure engagement with said clip.

8. A readily attachable shutter and photoflash synchronizing device for cameras having a shutter trigger on the camera case and a viewfinder clip adjacent thereto comprising: switch mechanism including a pair of contacts and having means receivable in said viewfinder clip for quickly and readily attaching the same on the camera case in a predetermined fixed position, a shutter trigger actuating element in operating alignment with said shutter trigger when said switch mechanism is in said predetermined fixed position, means comprising a manually operable member for closing said contacts and operating said element, and means for adjusting said element and said contacts relative to each other, and means resisting movement of said member but releasable therefrom when said member arrives at a predetermined position, whereby said shutter trigger is positively actuated despite variation of manual force applied to said member.

9. The combination with a camera having a shutter and a trigger for actuating the shutter and with a photoflash lamp having a circuit for controlling the same, of a switch for actuating said trigger and for closing the circuit to said flashlamp, including a handle member movable through a predetermined path of movement to close the contacts of said switch, means detachably mounting said switch upon said camera to dispose said handle member relative to said trigger for movement of said trigger, means on said handle member for engaging said trigger to actuate the same as said handle member is moved toward contact closing position, said mounting means including detachable members normally disposing said trigger engaging means in spaced relation to said trigger, spring means engageable with said handle for resisting the movement of said handle toward trigger operating position, and means responsive to arrival of said handle at a position closely approaching trigger operating position for rendering said spring means ineffective to resist further movement of said handle to insure rapid completion of the movement of said handle to trigger operating position, whereby the time between closing of said contacts and the opening of said camera shutter is substantially independent of the pressure applied to said handle.

10. In an attachment device for completing an electric circuit to fire a photoflash lamp in synchronism with the opening of the shutter of a camera having a shutter trigger on the camera case for actuating the shutter and a view-finder clip on said case, the combination of: a base member including means receivable in said viewfinder clip for detachably securing said base member to said camera case in a predetermined position relative thereto; switch means carried by said base member including a pair of contacts in said circuit; a handle member mounted on said base member for movement to close said contacts and complete said circuit; one of said contacts being attached to said handle member to move therewith, a strip secured to said base member and carrying the other of said contacts, said strip being freely flexible in a downward direction and so flexing when said handle member is moved to close said contacts; a limit bar 30 at the upper face of said strip and extending part of the length of said strip from the support of said strip toward the contact thereof and of sufficient rigidity to prevent ready upward flexing of said strip and constituting means to limit the return movement of said strip in an upward direction; actuating means on said handle member disposed in such position relative to said base member as to place said actuating means in a position to engage said trigger when said base member is disposed in said predetermined position and said handle member is moved to contact closing position.

11. In an attachment device for completing an electric circuit to fire a photoflash lamp in synchronism with the opening of the shutter of a camera having a shutter trigger on the camera case for actuating the shutter and a view-finder clip on said case including a pair of longitudinally extending inwardly facing channels, the combination of: a base member having a pair of outwardly extending flanges closely receivable in said channels to secure detachably said base member to said case; switch means carried by said base member including a pair of contacts in said circuit; a handle member mounted on said base member for movement to close said contacts and complete said circuit; actuating means on said handle member disposed in such position relative to said base member as to place said actuating means in a position to engage said trigger when said base member is disposed in said predetermined position and said handle member is moved to contact closing position; means adjusting the spacing of said actuating means relative to said trigger for synchronizing the opening of said shutter with the firing of said flash lamp; spring means interposed between said handle and said base member for urging said contacts to circuit opening position; and means for rendering said flanges resilient in a direction normal to the surface thereof including longitudinal slots formed in the edges of said flanges, the depth of said slots being such as to render said flanges much stiffer than said spring means, whereby said flanges prevent forces applied to said handle from moving said base member relative to said clip while maintaining secure engagement with said clip, the said clip having an upwardly extending alignment stop pin between said inwardly facing channels and said base member having a vertically extending alignment recess between its outwardly extending flanges for receiving said stop pin, thereby positively to position said base member in an exact predetermined accurate position when inserted in the clip.

IRVING JACOBSON.